US006341249B1

(12) United States Patent
Xing et al.

(10) Patent No.: US 6,341,249 B1
(45) Date of Patent: Jan. 22, 2002

(54) AUTONOMOUS UNIFIED ON-BOARD ORBIT AND ATTITUDE CONTROL SYSTEM FOR SATELLITES

(76) Inventors: Guang Qian Xing, 8515 Pelham Rd., Bethesda, MD (US) 20817; Shabbir Ahmed Parvez, 2702 Copper Creek Rd., Herndon, VA (US) 20171

(*) Notice: Subject to any disclaimer, the term of this patent is extended or adjusted under 35 U.S.C. 154(b) by 0 days.

(21) Appl. No.: 09/500,530

(22) Filed: Feb. 9, 2000

Related U.S. Application Data

(60) Provisional application No. 60/119,710, filed on Feb. 11, 1999.

(51) Int. Cl.$^7$ ................................................ B64G 1/24
(52) U.S. Cl. ..................... 701/13; 244/158 R; 244/164; 244/176
(58) Field of Search ............... 701/13, 226; 244/158 R, 244/164, 176, 171

(56) References Cited

U.S. PATENT DOCUMENTS

| 4,667,203 A | 5/1987 | Counselman, III ..... 342/357.06 |
| 5,109,346 A | 4/1992 | Wertz .......................... 701/226 |
| 5,267,167 A | 11/1993 | Glickman .................... 701/226 |
| 5,374,011 A | 12/1994 | Lazarus et al. ............ 244/75 R |
| 5,528,502 A | 6/1996 | Wertz .......................... 701/226 |

FOREIGN PATENT DOCUMENTS

DE 4243395 6/1993

OTHER PUBLICATIONS

B.A.C. Ambrosius et al., "Application of the Global Positioning System for Hermes Rendezvous Navigation", *Journal of Guidance, Control and Dynamics*, vol. 16, No. 1, pp. 197–205, Jan.–Feb. 1993.

Isaac Kaminer et al., "Control of an Underwater Vehicle Using H $_\infty$ Synthesis", *Proceedings of the 30$^{th}$ Control on Decision and Control*/Brighton, England, pp. 2350–2355, Dec. 1991.

T. Ladhiri, "LQR/LTR Pitch Attitude Control of an Earth–Orbiting Spacecraft," *Proceedings of the 32$^{nd}$ Conference on Decision and Control*, San Antonio, Texas, Dec. 1993.

T. Holzhuter, "LQG Approach for the High–Precision Track Control of Ships", *IEE Proc. Control Theory Appl.*, vol. 144, No. 2, Mar. 1997.

(List continued on next page.)

*Primary Examiner*—William A Cuchlinski, Jr.
*Assistant Examiner*—Marthe Y. Marc-Coleman
(74) *Attorney, Agent, or Firm*—Rader, Fishman & Grauer P.L.L.C.; Robert S. Green

(57) ABSTRACT

An apparatus and method of unified orbit and attitude control for acquisition and maintenance techniques of multiple satellites in a formation based on GPS input, utilizing Modern Feedback Control for providing precise autonomous on-board orbit and attitude control. This control system can place and maintain any satellite in its designated location in a formation, while simultaneously providing the capability to attain and maintain the attitude of any of the satellites in the formation with respect to the reference 'head-of-fleet' satellite. Utilizing the two different options of GPS signal, code pseudo range for orbit determination and control and phase pseudorange for attitude determination and control, the relative orbit and attitude state vectors of all the satellites in the formation is determined and modern advanced multivariable feedback control techniques, for example, linear quadratic Gaussian/loop transfer recovery controllers for orbit control and Sliding Controller or Lyapunov Controller for attitude control are used to provide a unified orbit and attitude control. The control of acquisition and maintenance for multiple spacecraft formation flying is a tracking problem, which can be converted into a regulator problem using the relative orbit and relative attitude kinematics and dynamics.

23 Claims, 4 Drawing Sheets

OTHER PUBLICATIONS

G.Q. Xing et al, "Relative Attitude Kinematics & Dynamics Equations and Its Applications to Spacecraft Attitude State Capture and Tracking in Large Angle Slewing Maneuvers".

P. Maute et al., "Autonomous Geostationary Stationkeeping System Optimization and Validation", *Acta Astronautica*, vol. 20, pp. 93–101 (1989).

M.C. Eckstein et al., "Autonomous Station Keeping of Geostationary Satellites".

M. C. Eckstein, "Optimal Autonomous Station Keeping of Geostationary Satellites", AAS/AIAA Astrodynamocs Specialist Conference, Lake Taho, Nevada, Aug. 3–5, 1981.

Juan J. Martinez, Optimal Orbit Control for Station Keeping Within the Multisatellite Support System (MSSS), European Space Operations Centre (ESOC), Darmstadt, Germany.

S. Hubert et al., "Stationkeeping of a Constellation of Geostationary Communications Satellites", AIAA/AAS Astrodynamics Conference, Seattle Washington, Aug. 20–22, 1984.

J. Potti et al., "An Autonomous Station Keeping System for Future Geostationary Telecommunication Satellites (An Artemis Based Ask System)".

J. W. Lowrie, "Autonomous Navigation Systems Technology Assessment", 17$^{th}$ Aerospace Sciences Meeting, New Orleans, LA, Jan. 15–17, 1979.

F. W. Boltz, "Autonomous Orbital Navigation Using Kepler's Equation", AIAA Mechanics and Control of Flight Conference, Anaheim, California, Aug. 5–9, 1974.

F. L. Markley, "Autonomous Satellite Navigation Using Landmarks".

John T. Collins et al., "Autonomous Constellation Maintenance System", 10$^{th}$ Annual AIAA/USA Conference on Small Satellites.

W. Kang, "Control of Spacecraft via Nonlinear H ∞ method", Dec. 14, 1994.

John Ting–Yung Wen, "The Attitude Control Problem", *IEEE Transactions on Automatic Control*, vol. 36, No. 10, Oct. 1991.

John L. Junkins et al., "Nonlinear Adaptive Control of Spacecraft Maneuvers", vol. 20, No. 6, Nov.–Dec. 1997.

S. R. Vadali, "Variable–Structure Control of Spacecraft Large–Angle Maneuvers", vol. 9, No. 2, Mar.–Apr. 1986.

Bong Wie et al., "Quaternion Feedback for Spacecraft Large Angle Maneuvers", vol. 8, No. 3.

John L. Crassidis et al., "Sliding Mode Control Using Modified Rodriques Parameters", *J. Guidance*, vol. 19, No. 6.

Stephen J. Fujikawa et al., "Spacecraft Attitude Determination by Kalman Filtering of Global Positioning System Signals", vol. 18, No. 6, Nov.–Dec. 1995.

W. H. Clohessy et al., "Terminal Guidance System for Satellite Rendezvous", *Journal of the Aerospace Sciences*, Sep. 1960.

Thomas A. W. Dwyer III et al., "Variable–Structure Control of Spacecraft Attitude Maneuvers", vol. 11, No. 3, May–Jun. 1988.

E. J. Lefferts et al., "Kalman Filtering for Spacecraft Attitude Estimation", vol. 5, No. 5, Sep.–Oct. 1982.

J. D. Schierman et al., Attitude and Trajectory Determination Using Magnetometers and Estimated Rates, Presented at the Flight Mechanics Symposium, NASA Goddard Space Flight Center, May 1997.

P. K. C. Wang et al., "Coordination and Control of Multiple Microspacecraft Moving in Formation", *The Journal of the Astronautical Sciences*, vol. 44, No.3, pp. 315–355, Jul.–Sep. 1996.

R. J. Helgeson et al., "Saturation Constrained LQR".

John L. Crassidies et al., "Optimal Interger Resolution for Attitude Determination Using Global Positioning System Signals".

Yaakov Oshman et al., "Efficient Sequential Attitude Estimation from Vector Observations".

Jongrae Kim et al., "Disturbance Accommodating Sliding Mode Controller for Spacecraft Attitude Moneuvers".

Yaakov Oshman et al., "Attitude/Attitude–Rate Estimation from GPS Differential Phase Measurements Using Integrated–Rate Parameters".

Clark E. Cohen, "Attitude Determination".

John L. Crassidis et al., "Predictive Attitude Estimation Using Global Positioning System Signals".

Frank H. Bauer, "Autonomous Navigation & Control formation flying in the 21$^{st}$ Century", May 7, 1997.

LEAD SATELLITE COORDINATES

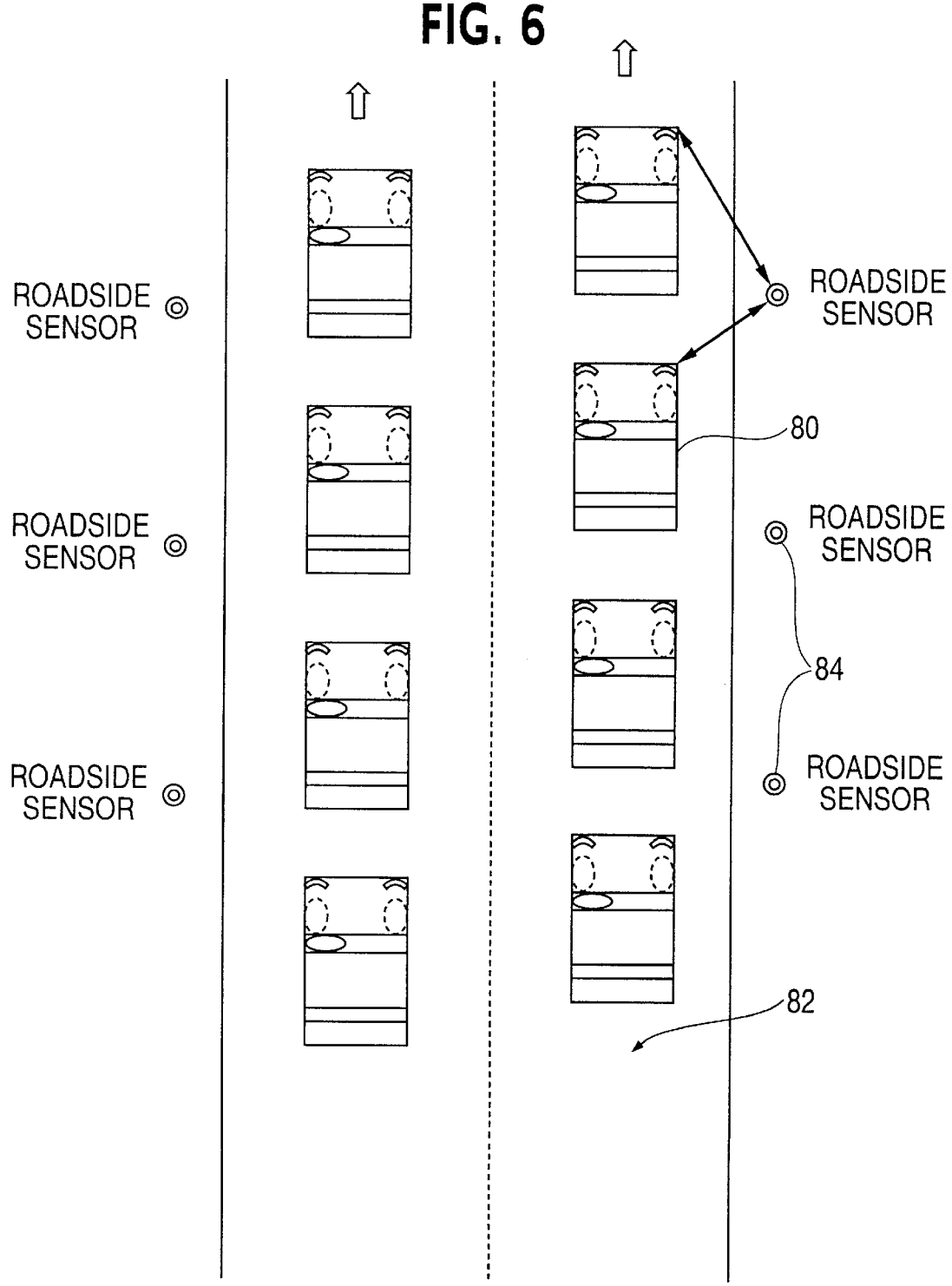

AUTONOMOUS UNIFIED ON-BOARD ORBIT AND ATTITUDE CONTROL SYSTEM FOR SATELLITES

This application claims the benefit of U.S. Provisional Application No. 60/119,710, filed Feb. 11, 1999.

The U.S. Government has a paid-up license in this invention and the right in limited circumstances to require the patent owner to license others on reasonable terms as provided for by the terms of contract number NAS5-98092 awarded by the United States National Aeronautics and Space Administration.

FIELD OF THE INVENTION

This invention relates generally to simultaneous orbit and attitude control for acquisition and maintenance techniques for individual satellites as well as for multiple satellites in a constellation or formation, in which Modern Feedback Control is used for determining precise real-time autonomous on-board navigation, attitude estimation and both orbit and attitude control. The orbit control function of this control system can place any satellite in any orbit position in a formation or in a constellation, including the acquisition of the initial distribution for the constellation/formation after satellite separation from launch vehicles, and can also maintain the constellation/formation distribution. The attitude control function simultaneously estimates the attitude state and acquires and maintains desired attitude, including providing the required attitude maneuvers. In formation flying this unified control system establishes and maintains the satellite separation and phasing with respect to the 'head of the fleet' satellite, and synchronizes the satellite orientations with respect to this 'head of the fleet'.

BACKGROUND OF THE INVENTION

The orbital control of satellites, in both geostationary orbits (GEO) and low-earth orbits (LEO), has primarily been ground-based. Orbit maintenance and station keeping have historically required involvement of Control Center personnel in all phases of operation. The computational burden for satellite control, including orbit analysis, maintenance and station keeping, has been on the ground computers. The ground computers provide both the off-line functions of orbit determination and maneuver planning as well as the on-line functions of commanding and telemetry processing.

With evolution of the concepts of operating large number of satellites in a constellation, attention has been focused on developing autonomous on-board orbit control system that removes the need for ground-based orbit control. One such design, shown in U.S. Pat. No. 6,089,507, provides for autonomous orbit control through modern feedback control, using GPS and a controller such as the Linear Quadratic Gaussian (LQG) with Loop Transfer Recovery (LTR) and/or H-infinity Controller.

Traditionally, all earth orbiting satellites have had some form of on-board attitude determination and control system. Many attitude determination systems used some form of attitude sensing devices, such as earth sensors, sun sensors, star trackers, gyroscopes, and the like to provide attitude information. Actuators, such as reaction wheels, momentum wheels, magnetic torquers and thrusters, used this information to provide the attitude control based on pre-programmed parameters.

Various methods have been studied for autonomous control of satellite navigation. U.S. Pat. No. 5,109,346 to Wertz discloses autonomous navigation control using Global Positioning Satellites (GPS) for orbit determination, and a method for providing orbital corrections. However, Wertz uses a non-feedback control system, which is subject to unstructured uncertainty. Additionally, Wertz is limited to real-time orbit and attitude determination, not real-time control and/or correction. Furthermore, position finding using GPS is known, as described for example, in U.S. Pat. No. 4,667,203 to Counselman, III.

Various methods have also been studied for developing the required relative dynamics and kinematics equations that are required for formation flying orbit and attitude control. For example, Bauer, F. H., Hartman, K., Forta, D., and Zuinn, D., in their paper "Autonomous Navigation and Control—Formation Flying in the $21^{st}$ Century," present the coordinates for control of multiple satellites moving in formation, without providing any detail on the method of obtaining this information for implementation.

Similarly, in Wang and Hadaegh, "Coordination and Control of Multiple Micro Spacecraft Moving in Formation," each of the spacecraft moving in formation is modeled as a rigid body with fixed center of mass, and various schemes for generating the desired formation pattern are discussed. While they provide explicit laws for formation-keeping and relative attitude alignment based on nearest neighbor-tracking, they do not study or provide any method of obtaining this measurement information nor the actual implementation.

For attitude control, systems were designed using other controllers, such as proportional-integral-derivative (PID) compensators using a variety of frequency response techniques. However, the PID design requires trade-offs with conflicting design objectives, such as gain margin and closed-loop bandwidth, until an acceptable controller is determined. When the control dynamics are complex, or poorly modeled, or when the performance specifications are particularly stringent, PID system performance erodes. In cases where optimal control design have been used, no measurement feedback was incorporated.

SUMMARY OF THE INVENTION

It is an object of the present invention to utilize modern advanced multivariable feedback control techniques in the design of an unified real-time on-board orbit and attitude control system using GPS feedback. For orbit control, the control techniques to be used are the LQG/LTR for orbit maintenance and Feedback Linearization Control for orbit acquisition. For attitude control, the control techniques to be used are the Nonlinear Lyapunov Control and Sliding Robust Control.

These more powerful design tools result in a higher level of satisfaction only if a solution exists to the problem being solved. Achieving both satisfactory performance limits and ascertaining the existence of a satisfactory controller involves using an optimization theory. Use of an optimization theory helps avoid searching for solutions to problems for which there are no solution. A further benefit of optimization is that it provides an absolute scale of merit against which any design can be measured. These more powerful design tools utilize modern advanced multivariable feedback control techniques.

This invention provides a unified orbit and attitude control system on-board a satellite in orbit, the system having two closed loop multivariable controllers, a receiver that receives data for both satellite position and orientation, and a converter that converts the orbit and attitude control problem into a state-space form. For orbit control, the converter converts the control problem into a tracking problem and a regulator problem in order to minimize the position error and velocity error between the body in motion and a target. For attitude control, the converter converts the satellite orientation of the various satellites in formation into a relative attitude state, and the regulator minimizes this relative error to track and maintain the desired attitude orientation. The receiver receives data from the Global Positioning Satellite System or other external location information provider. This data typically comes in the form of Code pseudorange, which provides the positioning information, and Phase pseudorange, which provides attitude information. Both the attitude and orbit controllers are modern feedback closed loop controllers.

This invention provides a combined orbit and attitude control system that uses the orbit state vector to describe the orbit control system and relative attitude kinematics to describe the attitude control system. Control is provided by modern advanced multivariable feedback control techniques, for example, linear quadratic Gaussian/loop transfer recovery (LQG/LTR) controller for orbit maintenance control, a feedback linearization controller for orbit acquisition control, and a Lyapunov controller for attitude control. These controllers enhance the control system performance by minimizing the control error and control effort. Additionally, the real time feedback control results in optimum implementation of an on-board autonomous control system.

Attitude determination and control for formation flying requires the additional development of the relative attitude dynamics and kinematics, since formation flying requires attitude control relative to a particular 'lead' satellite, or 'fleet-head'. Additionally, optimum control of formation flying will require a unified and autonomous orbit and attitude control system, whereby the two optimally interact to provide the required separation and phasing in position and orientation.

In its simplest form, formation flying is the situation where a first body is generally following a second body, in direction, attitude and speed. Commonly seen in military aircraft, where multiple planes fly in a group, the group following a lead plane while spaced apart a predetermined distance, and the group of following planes duplicating the changes in attitude, speed and direction of the lead plane. The lead body in a formation can be any body in the group. The lead body can also be a phantom, or a phantom can take the place of any body in the group. A constellation is simply of group of bodies, which may or may not be in formation. For satellites, autonomous attitude control for formation control is the use of relative attitude kinematics and dynamics, described relative to a particular reference satellite system. A 'head-of-fleet' reference system is used, by which the attitude kinematics and dynamics of all satellites in the formation are transformed into the 'head-of-fleet' coordinate system. Reduction of the attitude kinematics and dynamics into this common reference frame makes it possible to design the attitude control system. Control implementation of the chaser body to track and maintain positional relationship with the leader generally will require knowledge of relative position and velocity of the chaser and the leader, the angular velocity of the chaser, the attitude control torque of the chaser, and the orbit control force of the leader. The attitude dynamics is non-linear, and the development of the relative attitude kinematics and dynamics involved defining an 'Attitude State' consisting of both angular position and angular rates, and defining the attitude state in terms of both attitude angle and the angular rates.

Since the attitude dynamics is nonlinear, nonlinear controllers, such as Lyapunov and Sliding controllers, are well suited for use in the controller.

Additionally, a method and apparatus are provided for autonomous orbital and attitude control for a satellite, providing both the strategy and the controller design to achieve these strategies while applying the concepts of modern control theory to the classical problem of orbital mechanics. Furthermore, an orbit control apparatus and method for converting the orbit control problem into 1) a tracking problem and 2) a regulator design problem is provided, where the control problem minimizes both position error and velocity error between the satellite (also known as the pursuer) and its target position in a formation. This target position is separated from the lead satellite according to predetermined requirements of the particular formation.

The present invention further provides an attitude control apparatus and method for converting a tracking problem into a regulator design problem by using relative attitude control, where the control problem minimizes both relative attitude angle error and angular velocity error between the pursuer satellite and the target attitude state as represented by the lead satellite in the formation. This target position can be the same attitude as the attitude of the lead satellite, or a commanded bias may be introduced.

The simultaneous elimination of these errors with minimum effort results in an optimal unified orbit and attitude control system. Both the orbital state and the attitude state of the member satellite is estimated from code pseudo-range and phase pseudo-range as derived from the Global Positioning System Satellites (GPS) using Kalman filtering techniques.

Additionally, the present invention provides for the use of positioning data from other sources, such as celestial measurements for estimating the orbital state of satellites, or use of Gyros/RMS for attitude estimation. Other sources of positioning data may be used, and the positioning data may be broadcast from other orbiting, flying or ground-based transmitters. Other sources of attitude information may be used, for example, Earth sensor, sun sensor or star tracker.

The control system of the invention uses four variations in the design of the controller to minimize the orbital error between a satellite and the target position in the orbit, and between the current attitude state and the target attitude state. These different design variations provide different levels of effectiveness caused by non-linearities and other systems uncertainties.

The object to be controlled does not have to be a satellite, but may be any body in motion needing attitude and/or trajectory adjustments.

The controller design preferably provides a GPS LQG/LTR autonomous orbit control and maintenance system for a multiple satellite formation, resulting in a measurement state feedback control design, consisting of a minimum variance estimator, for example, Kalman filter, and an optimal Linear Quadratic Regulator (LQR). Input to the regulator is the state estimate, and output of the regulator is the control law. The measurement controller is a linear quadratic Gaussian, LQG, controller. In order to increase robustness of the LQG controller, the loop transfer recovery (LTR) technique is used.

A second orbit controller design is provided implementing nonlinear feedback control using input/output feedback linearization controller. This is required to solve the nonlinear feedback problem for the case of satellite acquisition following separation from a launch vehicle. Initial acquisition of target positions following launch requires solving the nonlinear orbit control problem.

For attitude control, Lyapunov's nonlinear controller is provided. Spacecraft attitude control for formation flying requires dealing with relatively large angle maneuvers and attitude and angular velocity tracking, and these involve nonlinear kinematics and dynamics. Hence, a nonlinear controller design is required. This controller uses the GPS Phase Pseudorange measurement as input into the feedback control operations. This controller is designed to track and correct the attitude state, consisting of both attitude angle and the angular rates.

A second controller design, the Sliding Robust Nonlinear Controller, is also provided. This controller is also an attitude and angular velocity tracking controller, using the nonlinear kinematics and dynamics equations that have been developed for attitude tracking and control for formation flying. Signals from GPS satellites, or alternatively from gyros/RMS or other like sources of positional information, are used to directly or indirectly determine the satellite attitude state. Furthermore, it is used in the real time feedback loop to continuously estimate the error between a satellite attitude and a target attitude. Both the Lyapunov controller and the sliding controller capture and track large angle slew maneuvers.

Orbit feedback information is used to generate thruster commands for correction of the satellite orbit in order to null the error. When this cycle is repeated, the desired orbit is maintained. Similarly, attitude feedback information is used to generate commands for attitude actuators, which may include momentum wheels or other gyros, reaction wheels, magnetic torquers, thrusters, gas jets, solar sails, and the like. When applied to multiple satellites in a satellite constellation or formation, attitude and orbit maintenance of individual satellites, as well as the separation and phasing between satellites operating in the constellation or formation, can be performed. Additionally, a group of satellites flying in a precise formation can be treated as a virtual satellite, that is, where a grouping of satellites appear to function as a single larger satellite, providing a virtual platform for imaging, observation, and the like.

The invention can also be applied to non-orbiting bodies such as aircraft, ground vehicles or sea vehicles operating in formation. The bodies may be moving under motive force or free falling.

It will be appreciated from the foregoing that the present invention represents a significant advance in the field of autonomous orbit and attitude control of satellites or bodies in formation and constellations. Other aspects of the invention will become apparent from the following more detailed description, taken in conjunction with the accompanying drawings, Still other objects and advantages of the present invention will become readily apparent to those skilled in the art from the following detailed description, where we have shown and described only the preferred embodiments of the invention, simply by way of illustration of the best mode contemplated by us of carrying out our invention. As will be realized, the invention is capable of other and different embodiments, and its several details are capable of modifications in various respects, all without departing from the invention. Accordingly, the drawings and descriptions are to be regarded as illustrative in nature, and not as restrictive.

BRIEF DESCRIPTION OF THE DRAWINGS

The preferred embodiments will be described with reference to the drawings, in which like elements have been denoted with like reference numerals throughout the figures, in which:

FIG. 6 illustrates ground vehicles moving in formation along a "smart highway".

DETAILED DESCRIPTION OF THE PREFERRED EMBODIMENTS

Figure 1:
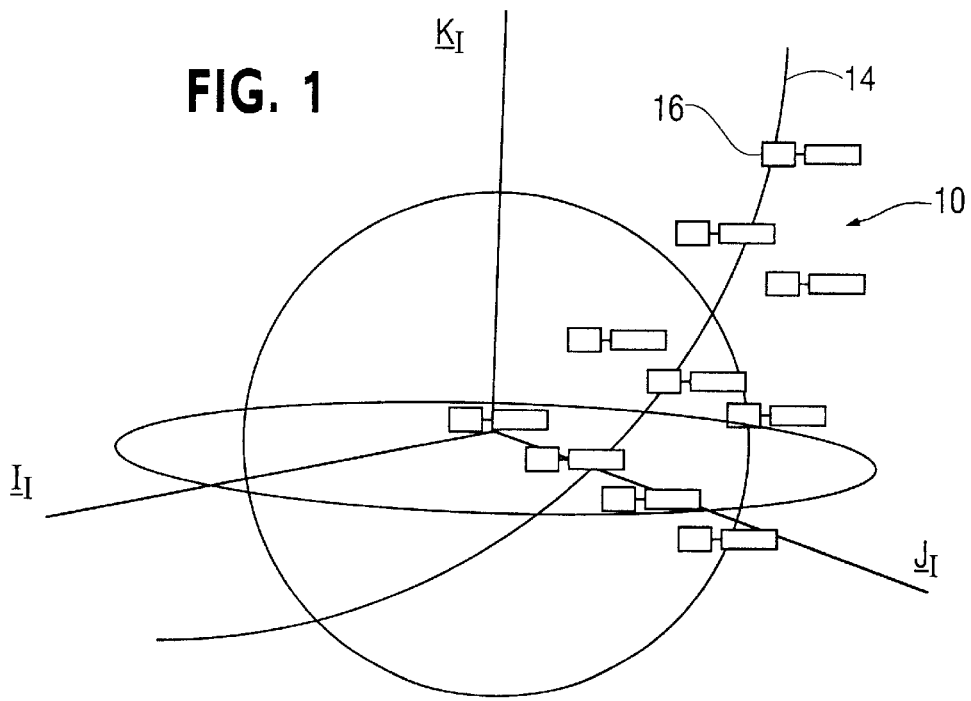
FIG. 1 is a diagram depicting spacecraft flying in formation in orbit.

This invention is an apparatus, a system and a method for autonomous unified orbit and attitude control of spacecraft flying in formation. FIG. 1 shows ten bodies, or satellites 10 in motion in a formation about the Earth 12. Formation movement can be defined as more than one body 10 moving along a common path 14 with stable or near constant separation. Formation flying relates to aircraft or spacecraft where the bodies 10 are following a lead, or reference body 16 and adjust their attitude to appear mimicking the lead body 16 in the group, matching the lead body 16 in both speed and attitude. The speed and attitude can be biased, resulting in speed and attitude adjustments that are different from the lead body 16. The reference body 16 may or may not be the leading body in the group, that is, the reference body 16 could be a body 10 located in the middle of the group, or at the side of the group, or anywhere in the group. The lead body 16 may be a phantom, allowing for a group of bodies to change position in a formation while one or more of the group is a phantom.

Figure 2:
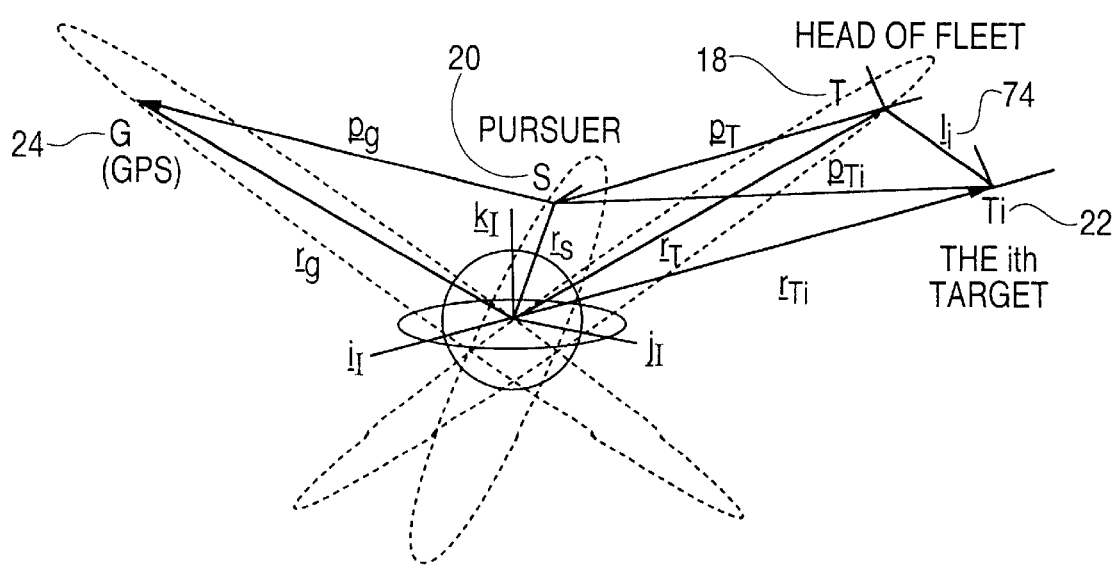
FIG. 2 is a diagram of the geometrical relationship among the Chase Spacecraft, the Head of Fleet Spacecraft, the target position of the ith Member Spacecraft, and the GPS Satellite used for defining the target position, target velocity and the errors in this invention.

In FIG. 2, the orbit of a reference or lead satellite 18, also known as the 'head-of-fleet' satellite, the pursuer satellite 20, the target orbital position of the pursuer orbit 22, and the GPS satellites 24 are determined in terms of position and velocity with respect to three orthogonal axis, $i_I$, $i_J$, $k_I$, defined as the Earth Centered Inertial (ECI) reference frame, and transformed to obtain the relative position and velocity errors.

In this reference frame, position of the lead satellite 18 is initially defined with respect to the earth's center, and is expressed in the inertial coordinate system. The relative position and velocity of the pursuer satellite 20 with respect to its target orbital position 22 is defined in terms of the local coordinate system of the lead satellite 18. The target orbital position 22 is the location where the pursuer satellite 20 is desired. The target orbital position 22 minus the current position of the pursuer satellite 20, is the desired amount of location change.

The position vector of the lead satellite 18 is $r_T$. The satellite that is being controlled is called the Chaser, or pursuer satellite 20, and the position vector of the pursuer satellite is denoted by $r_s$. The position vector of the ith target position 22, which is the designated and target position for the pursuer satellite 20, is denoted by $r_{Ti}$.

The vector $l_i$ represents the spacing between the lead satellite 18 and the target orbital position 22, and is determined by the desired formation geometry. The requirement of the satellite orbit control system is to minimize error vector $\rho_{Ti}$. When this occurs, the ith satellite or pursuer 20 in the formation has acquired the designated target orbital position 22. The orbit controller maintains the vector $l_i$ by minimizing the vector $\rho_{Ti}$. The mathematical model for formation flying in terms of the local horizontal coordinate system of the lead satellite 18 is $$\underline{\dot{\rho}}_{Ti} = \begin{bmatrix} 2\omega_0^2 + \dot{\theta}_T^2 & \ddot{\theta}_T & 0 \\ -\ddot{\theta}_T & -\omega_0^2 + \dot{\theta}_T^2 & 0 \\ 0 & 0 & -\omega_0^2 \end{bmatrix} \underline{\rho}_{Ti} + 2 \begin{bmatrix} 0 & \dot{\theta}_T & 0 \\ -\dot{\theta}_T & 0 & 0 \\ 0 & 0 & 0 \end{bmatrix} \underline{\dot{\rho}}_{Ti} + \underline{u} \quad [1]$$

where $$\underline{u} = u^T \Im T \quad [2]$$

$\Im_T$ is the vectrice of the local horizontal reference system for the target satellite, and $$u = \begin{bmatrix} \dot{\theta}^2 + 2\omega_0^2 & \ddot{\theta}_T & 0 \\ -\ddot{\theta}_T & \dot{\theta}^2 - \omega_0^2 & 0 \\ 0 & 0 & -\omega_0^2 \end{bmatrix} \begin{bmatrix} l_{xi} \\ l_{yi} \\ l_{zi} \end{bmatrix} + \quad [3]$$

$$2 \begin{bmatrix} 0 & \dot{\theta}_T & 0 \\ -\dot{\theta}_T & 0 & 0 \\ 0 & 0 & 0 \end{bmatrix} \begin{bmatrix} l_{xi} \\ l_{yi} \\ l_{zi} \end{bmatrix} - \begin{bmatrix} \ddot{l}_{xi} \\ \ddot{l}_{yi} \\ \ddot{l}_{zi} \end{bmatrix} + R_{TB} \frac{f_S}{m_S} - \frac{f_T}{m_T}$$

Equation 1 is the equation of motion in terms of the relative error vector $\rho_{Ti}$, which has been defined above and shown in FIG. 2. This equation is provided in terms of $\theta$ and $\omega$ and their respective time derivatives, where $\theta$ represents the angular position of a satellite 10 in its orbit, and $\omega$ represents the angular velocity of the satellite 10 in its orbit. The last term u represents external forces affecting the satellite motion, and this is further defined in equations 2 and 3, which show the required coordinate transformation representing the forces in terms of the local coordinate system of the lead satellite 18. The terms $m_s$ and $f_s$ represent the mass and control forces for the pursuer satellite 20, while and the terms $m_t$ and $f_t$ represent the mass and control forces on the lead satellite 18.

The following provides the mathematical description of the attitude dynamics and controls associated with this unified attitude and orbit control system for formation flying.

Figure 3:
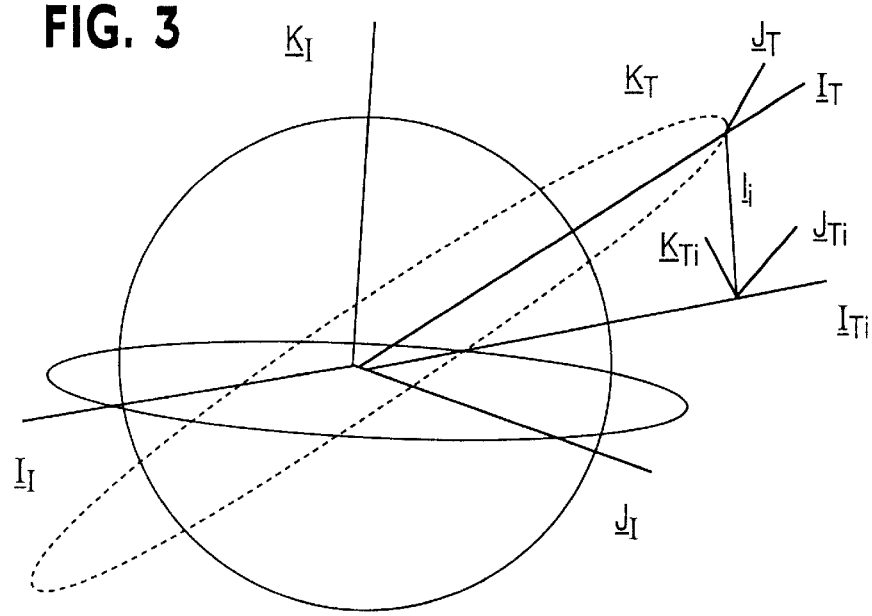
FIG. 3 illustrates the Local Horizontal Coordinate System of the Head Spacecraft and the ith Target Member Spacecraft in a 3-Dimensional Formation Pattern, used for defining satellite attitudes.

The attitude of a rigid spacecraft is the orientation of its reference frame with respect to another reference frame. The most convenient reference frame for these spacecraft is a right-handed orthogonal, that is, mutually perpendicular and of unit length, triad which is fixed to the body of the spacecraft. FIG. 3 shows the coordinate system for the lead Spacecraft 18 as $I_T$, $J_T$ and $K_T$, and for the ith target member pursuer satellite 20 as $I_{Ti}$, $J_{Ti}$ and $K_{Ti}$. Attitude with respect to an inertial reference frame is the absolute attitude, while the attitude with respect to a moveable rotating reference frame is called the relative attitude. In this invention, the attitude of the pursuer spacecraft 20 in the formation is transformed and obtained in terms of the lead spacecraft 18. This provides the capability to control and maintain spacecraft attitude relative to the lead spacecraft 18. Attitude control is thus a typical attitude state tracking problem. Using the concept of relative attitude and relative angular velocity, the attitude tracking problem is transferred into a regulator problem.

The attitude relationship between two reference systems is described by the attitude matrix R, a direction cosine matrix known in the art that determines the linear transformation between the two reference systems. Simplifying the design problem, this invention provides several different options for representing the attitude matrix R. Of these options, the 3-dimensional parameters used are the Euler angles, Rodrigues parameters, also known as Gibbs Vector, and the modified Rodrigues parameters. The 4-dimensional options are the axis/angle variables and the Quaternions. These are all the various options of representing attitudes that are available in standard Controls Systems text books. This invention uses these parameters as appropriate and convenient.

One aspect of this invention has been the development of kinematics and dynamics equations for relative attitude, which is necessary to solving the attitude control problem for large angle maneuvers and attitude state tracking. Also developed is a group of operation rules for relative attitude kinematics and dynamics, which makes the design of the attitude tracking problem substantially easier.

The first theorem of Kinematics for Relative Attitude developed are presented here for clarity. It is assumed that $\Im_I$, $\Im_B$ and $\Im_D$ are the inertial reference frame, body reference frame and the desired attitude reference frame, respectively. The angular velocity of $\Im_B$ and $\Im_D$ with respect to the inertial reference frame are $\omega_b$ and $\omega_d$, and may be defined as:

$$\underline{\omega}_b = \Im^T_B \omega_b$$

$$\underline{\omega}_d = \Im^T_D \omega_d \quad [4]$$

The relative attitude between the reference frames $\Im_I$, $\Im_B$ and $\Im_D$ are as follows:

$$\Im_B = R_{BI} \Im_I$$

$$\Im_D = R_{DI} \Im_I$$

$$\Im_B = R_{BD} \Im_D \quad [5]$$

Transformation matrix R represents the relative attitude matrix of the reference frame indicated by the first subscript with respect to the reference frame of the second subscript.

The kinematics equations for $R_{BD}$ and $R_{DB}$ in the body reference frame $\Im_B$ are:

$$\frac{dR_{BD}}{dt} = -\omega_{bd} \times R_{BD} \quad [6]$$

and $$\frac{dR_{DB}}{dt} = R_{DB} \omega_{bd} \times \quad [7]$$

where $$\underline{\omega}_{bd} = \underline{\omega}_b - \underline{\omega}_d = \Im^T_B \omega_{bd} \quad [8]$$

and $$\omega_{bd} = \omega_b - R_{bd} \omega_d \quad [9]$$

Similarly, the kinematics equations for $R_{DB}$ and $R_{BD}$ in the desired attitude reference frame $\Im_D$ are $$\frac{dR_{DB}}{dt} = -\omega_{db} \times R_{DB} \tag{10}$$

and $$\frac{dR_{BD}}{dt} = R_{BD}[\omega_{db}x] \tag{11}$$

The development of the above kinematic equations 1–11 are necessary for the development of the Formation Flying attitude control system, since the solution of the control problem involved transforming all force and dynamics equations into the lead satellite reference frame. The above equations 1–11 provide the relationships between the reference frames $\Im_B$ and $\Im_D$ for the transformation matrices $R_{DB}$ and $R_{BD}$, and their time derivatives and the angular velocities $\omega_b$ and $\omega_d$. These developments enable solution of the control and regulator problem.

The development of the attitude control system uses the relative attitude matrix, R, for the equations of motion. As noted earlier, there are various ways of representing these attitude matrices, such as, Quaternions, Rodrigues and modified Rodrigues parameters, and the Euler Angles. The relative kinematics were developed using all of these parameters and are described below. The choice of parameters for use in control systems design depends on its suitability for the specific control problem.

The first set of kinematic equations use the Quaternions, and are presented in equations 12–16. In these equations, the attitude matrix R is represented by the quartenions q1 through q4, and the equations relating R to q are available in standard Control Systems textbooks:

$$\dot{q}_{bd} = \frac{1}{2}(q_{bd}^x + q_{bd4}I)\omega_{bd} \tag{12}$$

and $$\dot{q}_{bd4} = -\frac{1}{2}\omega_{bd}^T q_{bd} \tag{13}$$

and $$\omega_{bd} = 2(q_{bd4}\dot{q}_{bd} - \dot{q}_{bd4}q_{bd} - q_{bd} \times \dot{q}_{bd}) \tag{14}$$

where the relative Quaternion attitude are defined as $$q_{bd} = \begin{bmatrix} q_{bd1} \\ q_{bd2} \\ q_{bd3} \end{bmatrix} = \sin\frac{\phi_{bd}}{2}a_{bd}, \tag{15}$$

$$\bar{q}_{bd} = \begin{bmatrix} q_{bd} \\ q_{bd4} \end{bmatrix},$$

$$q_{bd4} = \cos\frac{\phi_{bd}}{2}$$

where $a_{bd}, \phi_{bd}$ are, the relative axis/angle attitude parameters of the body reference frame $\Im_B$ with respect to the desired frame $\Im_D$. The relationship with the relative attitude matrix $R_{BD}$ is $$R_{BD}(q_{bd4}^2 - q_{bd}^T q_{bd})I 2q_{bd}q_{bd}^T - 2q_{bd4}[q_{bd}^x] \tag{16}$$

Similarly, the kinematics equations of relative attitude in Rodrigues Parameters was developed and are presented in equations 17–20. In this case, the Rodriguez parameters, g, represents the attitude matrix, while ω represents the relative angular motion between subscripted reference frame.

$$\dot{g}_{bd} = \frac{1}{2}(g_{bd}^x + g_{bd}g_{bd}^T + I)\omega_{bd} \tag{17}$$

and $$\omega_{bd} = \frac{2}{(1+g_{bd}^T g_{bd})}(I - [g_{bd}^x])\dot{g}_{bd} \tag{18}$$

where the relative Rodrigues attitude parameter is defined as $$g_{bd} = a_{bd}\tan\left(\frac{\varphi_{bd}}{2}\right) \tag{19}$$

The relationship between the relative Rodrigues attitude parameters and the relative attitude matrix is therefore $$R_{BD} = \frac{1}{(1+g_{bd}^T g_{bd})}((1-g_{bd}^T g_{bd})I + 2g_{bd}g_{bd}^T - 2[g_{bd}^x]) \tag{20}$$

Next, the kinematics equation of relative attitude in the Modified Rodrigues parameter was obtained. The Modified Rodrigues parameters are represented in equations 21–23 as p:

$$\dot{p}_{bd} = \frac{1}{4}[(1-p_{bd}^T p_{bd})I + 2[p_{bd}^x] + 2p_{bd}p_{bd}^T]\omega_{bd} \tag{21}$$

or $$\omega_{bd} = \frac{4}{(1+p_{bd}^T p_{bd})^2}[(1-p_{bd}^T p_{bd}) + 2p_{bd}p_{bd}^T - 2p_{bd}^x]\dot{p}_{bd} \tag{22}$$

where the relative modified Rodrigues attitude parameter is defined as $$P_{bd} = a_{bd}\tan\left(\frac{\phi_{bd}}{4}\right) \tag{23}$$

The relationship between the relative modified Rodrigues parameters and relative attitude matrix becomes:

$$R_{BD} = \frac{1}{(1+p_{bd}^T p_{bd})^2}\left[(1-6p_{bd}^T p_{bd} + (p_{bd}^T p_{bd})^2)I + \right. \tag{24}$$
$$\left. 8p_{bd}p_{bd}^T - 4(1-p_{bd}^T p_{bd})[p_{bd}^x]\right]$$

The next parameters involve the Euler angles. The kinematic equations in terms of the Euler Angles are $$\dot{\theta}_{bd} = S^{-1}(\theta_{bd}2, \theta_{bd}3)\omega_{bd} \tag{25}$$

where $$S(\theta_2, \theta_3) = \begin{bmatrix} \cos\theta_3\cos\theta_2 & \sin\theta_3 & 0 \\ -\sin\theta_3\cos\theta_2 & \cos\theta_3 & 0 \\ \sin\theta_2 & 0 & 1 \end{bmatrix} \tag{26}$$

The attitude matrix $R_{BD}$ in Euler angles is defined as $R_{321}$ rotation matrix, that is, for coordinate transformation, the order of rotation is axis 1, axis 2 and axis 3 in sequence. S represents the rotation matrix for successive rotation of $\theta_3$ about axis 3 and $\theta_2$ about axis 2.

Having developed the relationships of the attitude matrices in different reference frame, using various attitude representation options as presented above in equations 1–26, the relative Attitude Dynamics Equations of the invention can be developed.

In the following equations 27–31, $\underline{J}_b$, $\underline{\omega}_b$, $\underline{L}_b$ are the angular moment of inertia (dyadic), angular velocity, applied external torque (including control torque) of the pursuer satellite 20, and $\underline{J}_d$, $\underline{\omega}_d$, $\underline{L}_d$ are the angular moment of inertia (dyadic), angular velocity, applied external torque (including control torque) of the target satellite 18. In this manner, $$\underline{J}_B = \Im^T_B J_b \Im_B$$
$$\underline{\omega}_b = \Im^T_B \omega_b$$
$$\underline{L}_b = \Im^T_B L_b \qquad [27]$$

and the relative velocity is defined as:

$$\omega_{bd} = \omega_b = R_{bd}\omega_d \qquad [28]$$

The relative attitude dynamics equation in the pursuing satellite 20 reference frame $\Im_B$ is $$J_b\dot{\omega}_{bd} + \omega_{bd} \times J_b\omega_{bd} \times J_b R_{BD}\omega_d = L_b - R_{BD}(L_d + \Delta J_d\dot{\omega}_d + \omega_d \times \Delta J_d\omega_d + 2_{\omega d} \times J_b\omega bd) \qquad [29]$$

where $$J_d\dot{\omega}_d + \omega_d \times J_d\omega_d = L_d \qquad [30]$$

and $$\Delta J_d = R_{DB}J_b R_{BD} - J_d \qquad [31]$$

Using the transformational and kinematic relationships that have been presented, this set of relative attitude dynamics equations have been further developed for different reference systems, such as the target satellite reference frame, using the various attitude parametric representations. All of the above developments provide the complete set of tools that are necessary for defining the attitude transformations and relationships between the reference frames between the target satellite 18 and the pursuer satellite 20 in a formation. This forms an essential part of this invention of synchronous attitude tracking and control system for spacecraft flying in formation.

The preferred embodiment of the navigation and control system of this invention is the use of signals from the GPS satellites 24 to simultaneously determine both the orbital and attitude information of the pursuer satellites 20 to be controlled. The GPS signal 26 consists of the code pseudorange 30 and the phase pseudorange 38. The code pseudorange 30 is used for orbital information, and the phase pseudorange 38 is used for attitude information. From a given low earth orbit position, multiple GPS satellites 24 are visible. Preferably, the navigation and control system on a body 20 uses simultaneous signals from four GPS satellites 24. For spacecraft bodies 10 that are in higher orbits and/or outside of GPS coverage, data from celestial measurements may be substituted in order to determine the present orbit. Similarly, for attitude determination, data from Gyros or other Rate Measuring System, not shown, may be substituted in order to determine the satellite attitude. Feedback control systems use this orbit information, after being transformed into relative attitude and orbital information in the lead satellite coordinate frame, discussed above, as an input, processing the information and outputting closed-loop correction instructions to actuate thrusters on a spacecraft to continuously correct errors in position and velocity, and to enable attitude actuators, such as reaction wheels, momentum wheels, magnetic torquers or thrusters, to continuously correct and maintain satellite orientation relative to the lead satellite attitude. Other embodiments of the attitude and orbit control system of this invention provide for both linear and nonlinear control, providing differing amounts of controllability and robustness for different environments.

Figure 4:
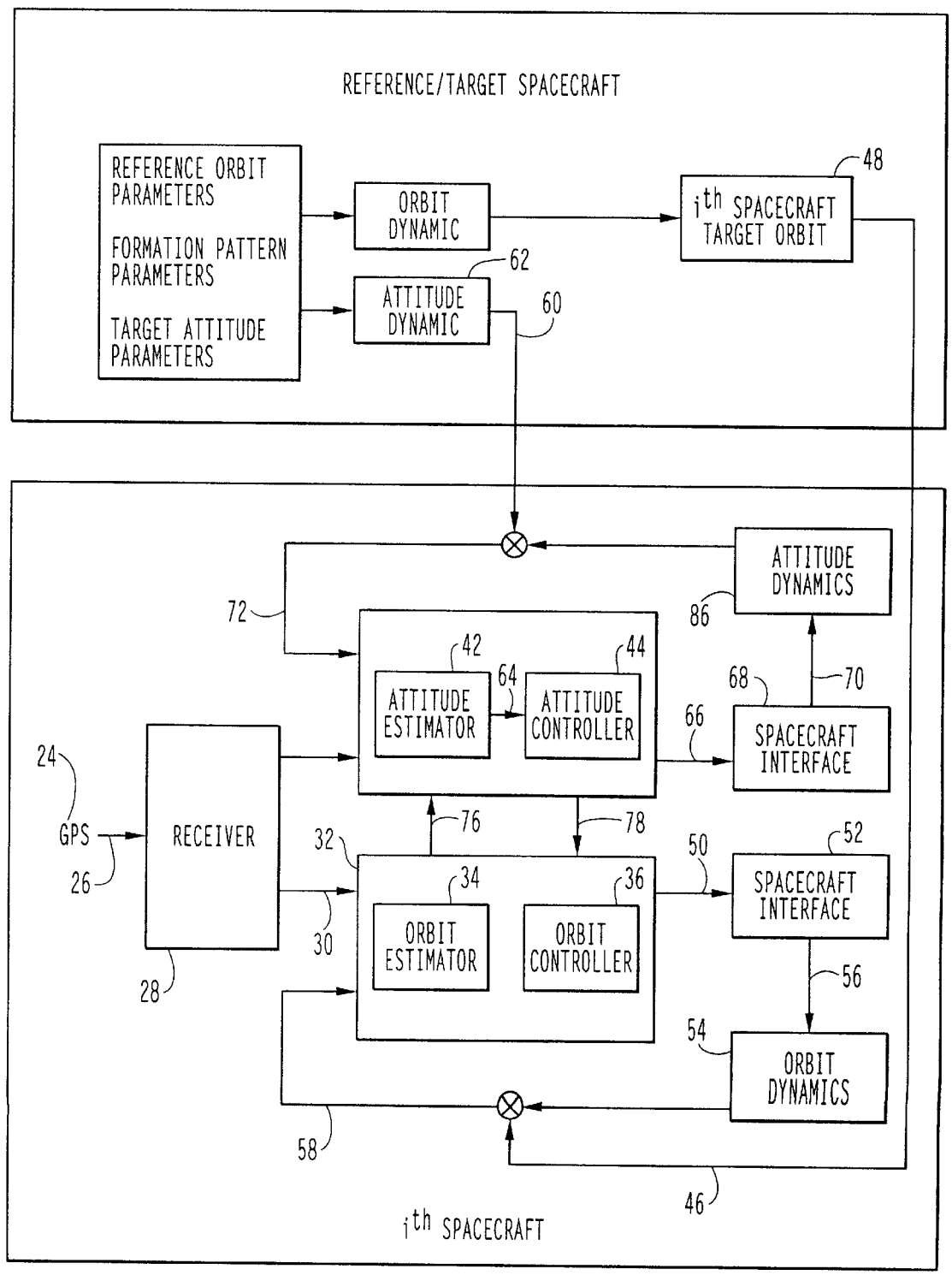
FIG. 4 illustrates the unified orbit and attitude control system of this invention.

FIG. 4 illustrates one embodiment of the unified attitude and orbit control system of this invention. A signal 26 from the GPS satellite 24 provides the input to the GPS receiver 28 located on a pursuer satellite 20. The receiver 28 splits the signal 26, directing the differential code pseudorange component 30 of the signal 26 to the orbit estimator/controller 32 on pursuer satellite 20 to provide orbital control. The orbit estimator/controller 32 contains an orbit estimator 34 and an orbit controller 36. In the preferred embodiment, two different versions of orbit controller 36 are provided. The first is for linear applications such as orbit maintenance, and the second is for nonlinear applications such as acquisition of target satellite position following separation from a launch vehicle. The first orbit controller is a linear quadratic Gaussian controller with Loop Transfer Recovery (LQG/LTR controller), and the second controller is a nonlinear controller using feedback linearization.

The receiver 28 directs the differential phase pseudorange component 38 of the signal 26 to the attitude estimator/controller 40 to provide attitude control. The attitude estimator/controller 40 contains an attitude estimator 42 and an attitude controller 44. This invention also provides two different versions of attitude controllers, having different characteristics and capabilities. The first is a Lyapunov nonlinear controller, and the second is a nonlinear robust controller using sliding control method.

Linear Quadratic Gaussian (LQG) control theory goes beyond the traditional PID controllers and is one of the new "powerful" design tools. The LQG theory assumes that the system under control has a known linear (and possibly time-varying) description, and that the exogenous, or external, noises and disturbances impinging on the feedback system are stochastic, having known statistical properties. Performance criteria for this controller involve minimizing quadratic performance indices. Additionally, this offers a true synthesis procedure. Once a quadratic performance index to be minimized is selected, the procedure supplies the unique optimal controller without further intervention from the designer. However, LQG optimizes performance but not robustness, and can exhibit arbitrarily poor stability margin. Common Kalman filters can be used so that full-state feedback properties can be "recovered" at the input of the system. This technique is known as Loop Transfer Recovery (LTR), and enhances the robustness of an LQG design.

A nonlinear controller provides control laws for systems that are not linear, where the relationship between impart and output are linear. Utilizing feedback linearization technique, a linear optimal control theory is used to design a nonlinear controller.

A nonlinear Lyapunov controller represents the application of Lyapunov's theory in control system design. For a minimally stable system, it is the desired control input such that the initial state returns to the original point. The solution to this problem starts by assuming a Lyapunov function. This controller is asymptotically stable.

The sliding mode controller, also known as the variable structure controller, presumes some kind of input commutation closely related to pulse width modulation controls. For a non-linear multivariable system with the input being a two valued function, the input function can be commuted from 0 to 1 so that the scalar function of the state vector defines a hyper surface determining the activity of the actuator. If the motion is stable around this surface, then it is said to be 'sliding' on the surface. A characteristic of any sliding motion is its insensitivity to a certain class of disturbances and/or system parameter uncertainties.

In the case of a linear system controlled by an on-off controller, the sliding mode controller can be regarded as a suitable way to determine an equivalent linear closed loop behavior, provided the full state of the system is available.

The first embodiment of orbit control system of this invention is shown in FIG. 4, where the orbit controller 36 is an LQG/LTR controller. The differential code pseudorange 30 component of the GPS signal 26 provides the orbital information to the pursuer satellite 20. The orbit estimator 34 estimates an orbit, which is transformed in terms of the lead satellite reference system. The target orbit information 46 is also provided, representing the ith target orbit 48 in the formation, and is used to provide the relative position and velocity between the pursuer satellite 20 and the target position 22, and then fed into the orbit controller 36. The controller 36 outputs the acceleration requirements 50 that the pursuer satellite 20 requires in order to correct its position and velocity error so as to maintain its position within the satellite formation or constellation. This information is used by the spacecraft orbit dynamics interface system 52, which transforms the velocity change requirement into actual thruster activity by taking into account the propulsion system of the pursuer satellite 20. The resulting thrusting activity 56 changes the pursuer satellite orbit dynamics resulting in a corrected orbit. This whole process is continuous, indicated by the flow line 58, and the closed loop feedback control system provides continuous orbital correction.

Alternatively, a nonlinear input/output feedback controller with feedback linearization can be substituted for the orbit controller 36, and the control flow will be similar to the control flow shown in FIG. 4.

The attitude control system of this invention is shown in FIG. 4, where the differential phase psuedorange component 38 of the GPS signal 26 provides the attitude information to the pursuer satellite 20 and is input into the attitude estimator 42, which determines the attitude of the pursuer satellite 20. The target attitude information 60 is the attitude of the lead reference satellite, or target position 22. A bias may also be introduced into the attitude dynamics 62. This information, after the necessary coordinate transformation, is used to determine the attitude error relative to the attitude of the target position 22. This relative attitude error is input 64 to the attitude controller 44. In the preferred embodiment, the attitude controller 44 is a Lyapunov Nonlinear Controller. The controller 44 outputs the actuator requirement 66 that is required to change the attitude of the pursuer satellite 20 and correct the relative error. This information is used by the spacecraft attitude dynamics interface system 68, which transforms the angle change requirement into required action, taking into account the design of the actuators on the pursuer satellite 20. The actuator may be momentum wheel, reaction wheel or thruster. The resulting actuation activity 70 changes the pursuer satellite 20 attitude dynamics 86, resulting in a corrected attitude. This whole process is continuous, indicated by the flow line 72, and the closed loop feedback control system provides continuous attitude correction.

In a unified control system, the orbital dynamics 54 must incorporate the orbit control problem, which is set up so that feedback control techniques of modern control theory are applied. Similarly, the attitude dynamics 86 must incorporate the attitude control problem, which is set up in terms of relative attitude angles or parameters. Large angle maneuvers or attitude tracking makes this process nonlinear. In both cases, a set of suitable orbital elements or attitude state are set up in the form of both state-space variables and a set of dynamic equations to be structured using the state-space variables must be developed.

In the preferred embodiment, the state-space is used for modeling the dynamic equations of both the orbit control and relative attitude control used by modern control theory. Orbit control is provided by the on-board closed-loop feedback controller, the input to which is the direct orbit measurement data. The state information of the satellite orbit can be provided on-line by the orbit control system for the attitude control system. The attitude determination system uses GPS differential phase psuedorange 38 for attitude determination and estimation, and a gyro inertial unit can be used for traditional determination of angular velocity. The attitude control system 40 uses a nonlinear attitude control law for large angle maneuvers. For example, it can be assumed that bodies 10 in formation are small satellites, and over a short control time interval, they can be modeled as rigid bodies with fixed center of mass. Mathematical models for the relative translation, or orbit motion, and rotation, or attitude motion, are treated separately.

In the state-space equations of relative orbital motion, the orbital control problem is converted into a tracking and regulator problem, where the control task minimizes the position and velocity error between a pursuer satellite 20 and the target position 22, thereby maintaining the desired separation li 74 from the lead satellite 18. Positioning a pursuer satellite 20 into the target position 22 within a formation is thus treated as a tracking problem. The desired space location being tracked is called the "ith target", and the problem is converted into relative dynamic equations of motion. In this manner, the orbital state is converted into a state-space system that lends itself to the desired controller design.

In order to apply the LQG/LTR controller for autonomous orbit control of a satellite, the constraints of the actuators used for orbit control is considered. For a given thrust level, the control force compatible with the given thrusters can be obtained. If a thruster can provide linear modulation for its jet force, it will be compatible with the output of the digital LQG/LTR controller, whose output is pulse-amplitude modulation of the control force. If the thruster is an on-off type, then the pulse-amplitude modulation will have to be transformed into pulse-width modulation.

Since the behavior of the satellite orientation with respect to the inertial reference frame under external torque depends on the rotation matrix and its angular velocity, the concept of Attitude State has been developed. This invention, therefore, has developed attitude state control, which provides the local horizontal reference frame for formation flying.

In order to simplify the design procedures, this invention provides definitions and relationships for the different concepts of relative attitude state kinematics and dynamics equations, such that the attitude tracking problem is translated into a regulator problem.

Attitude information is required for orbit estimation and control. The attitude of the satellite affects the velocity change obtained when a maneuver is performed. Similarly, orbital information is required for attitude estimation and control. This information can be passed between the two systems 32, 40 at 76, 78.

It will be appreciated from the foregoing description that the present invention represents a significant improvement in the development of autonomous control and maintenance system that will be required for flying satellites in a formation. In particular, the invention provides this control using a unique unified closed-loop feedback system that provides continuous control of both attitude and the orbital parameters, using the same GPS input 26 for the control of both attitude and orbital parameters.

Other important aspects of the invention are the use of three different Controllers—LQG/LTR, Lyapunov and Sliding Mode Controllers in this unified system. The LQG/LTR controller uses input code pseudorange signals 30 from GPS and outputs commands for spacecraft thruster activity to correct error in orbital position and velocity. The Lyapunov and Sliding Mode controllers use input phase pseudorange signals 38 from GPS and output commands for spacecraft attitude actuators to correct error in attitude relative to the lead satellite.

Figure 5:
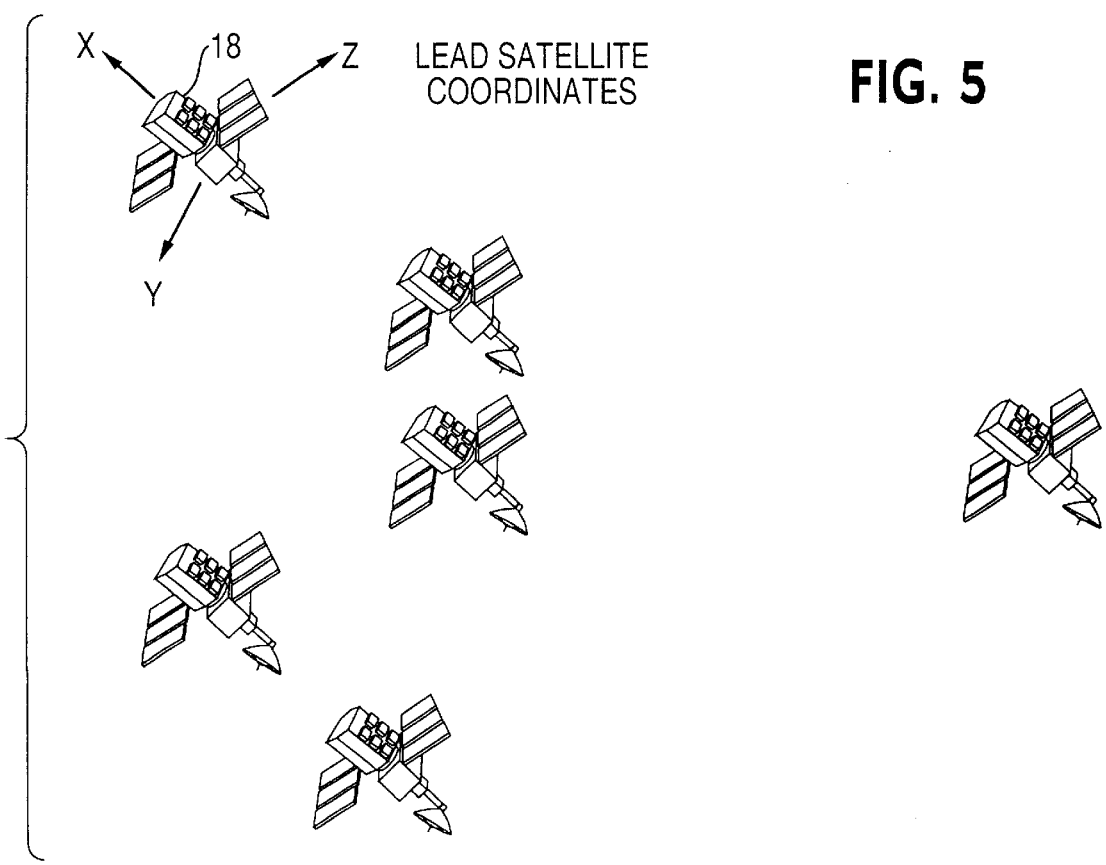
FIG. 5 illustrates relative attitude control of satellites for formation flying.

FIG. 5 shows the relative attitude control for formation flying of satellites. It should be noted that all the satellites in the figure have the same relative orientation as the lead satellite 18.

FIG. 6 illustrates another embodiment of this invention, when ground vehicles, for example automobiles 80, move in a formation along a road 82. FIG. 6 further illustrates the use of sensors 84 along the roadside. These sensors 84 send position information to the ground vehicles 80. Thus, the sensors 84 may also be transmitters as well as receivers. In this manner, spacing between vehicles can be controlled, thereby preventing collisions. Similarly, when the road 82 changes curvature, the ground vehicles 80 receive this information from the sensors 84 and alter speed and direction accordingly. A highway so equipped with these sensors is called a "smart highway". The information received by the transmitter may be vehicle information, such as identification, speed, direction, and the like. Information transmitted by the roadside sensor 84 may include geographic location, road condition, topographical information for the road, and the like. The ground vehicles are equipped with receivers for receiving the roadside information. The ground vehicles 80 may also be equipped with GPS receivers or receivers that retrieve similar position information. In this manner, the position information received by the ground vehicle 80 may come from a source other than the roadside sensor or GPS. Information received at the ground vehicle 80 may be used to determine and adjust vehicle spacing, vehicle speed, vehicle acceleration and deceleration, and vehicle direction. Future vehicles may have special equipment to determine and adjust various other parameters that affect on-board systems, for example, temperature, how many cylinders are actively firing in the engine, engine adjustments for fuel economy, tire pressure, deicing of one or more vehicle components, interior or exterior lighting, and emergency and non-emergency communications.

It will also be appreciated that, although a specific embodiments of the invention has been described in detail for purpose of illustration, this invention is applicable to any group of orbiting bodies, manned or unmanned, flying in formation or as a constellation, orbit around the earth, sun or any planetary body. It will also be appreciated that this invention is applicable to co-locating several geosynchronous satellites within a given orbital slot, as well as for aircraft, sea or land vehicles that operate in formation, or that require specific separation between the vehicles in formation.

What is claimed is:

1. An on-board system for a first body in motion comprising:
   a closed loop multivariable orbit controller;
   a closed loop multivariable attitude controller;
   a first and second receiver that receives positioning data;
   an orbit converter that converts an orbit control problem into an orbit state-space form; wherein the orbit controller uses the positioning data to determine the body's position in an inertial coordinate system and uses the orbit state-space form to determine if the position of the first body needs to be altered in real time for minimization of at least one of position, position error, velocity and velocity error between the first body and a target; and
   an attitude converter that converts an attitude control problem into an attitude state-space form; wherein the attitude controller uses the positioning data to determine the body's attitude and uses the attitude state-space form to determine if the position of the first body needs to be altered in real time for minimization of at least one of attitude, attitude angle, attitude angle error, angular velocity and angular velocity error between the first body and the target in the formation.

2. The system of claim 1 wherein the first body and the target are traveling in a formation.

3. The system of claim 1, wherein the target is one of a phantom reference and a lead body.

4. The system of claim 1, wherein the target is in formation with a lead body.

5. The system of claim 1, wherein the orbit control problem is converting to a tracking problem into a regulator problem for minimization of position error and velocity error between the first body and its target position in the formation which is a specified distance from the target.

6. The system of claim 1, wherein the attitude control problem is converting to a tracking problem into a regulator problem for minimization of attitude angle error and angular velocity error between the first body and the target.

7. The system of claim 1, wherein the orbit control problem is converting to a tracking problem into a regulator problem for minimization of position error and velocity error between the first body and its target position in the formation, the attitude control problem is converting a tracking problem into a regulator problem for minimization of attitude angle error and angular velocity error between the first body and the target, and the minimization of the orbit errors and the attitude errors occur simultaneously.

8. The system of claim 1, wherein the orbit controller is a Linear Quadratic Gaussian/Loop Transfer Recovery Controller.

9. The system of claim 8, wherein the orbit controller further comprises Nonlinear input/output Feedback Controller with Feedback Linearization.

10. The system of claim 1, wherein the attitude controller is Lyapunov Nonlinear Controller.

11. The system of claim 1, wherein the attitude controller is a Sliding Robust Nonlinear Controller.

12. The system of claim 1, wherein the positioning data is range data.

13. The system of claim 1, wherein the positioning data is range-rate data.

14. The system of claim 1, wherein the attitude data is at least one of Euler angles, quaternions, Rodriguez parameters, modified Rodriguez parameters, roll, pitch and yaw in an inertial coordinate system.

15. The system of claim 1, wherein the positioning data is received from a Global Positioning Satellite System.

16. The system of claim 1, wherein the first and second receivers are Global Positioning System (GPS) data receivers for receiving GPS signals and determining at least one of location coordinates and attitude coordinates of said first body.

17. The system of claim 16, wherein said GPS signal consists of at least one of a code pseudorange component and a phase pseudorange component.

18. The system of claim 17, wherein said code pseudorange component is used to determine said location coordinates of said first body, and said phase pseudorange component is used to determine said attitude coordinates of said first body.

19. The system of claim 1, wherein the first body and the target are earth orbiting satellites flying in formation.

20. The system of claim 1, wherein the first body and the target form a constellation.

21. The system of claim 1, wherein said attitude data is received from one of a gyros/rms, earth sensor, sun sensor and star tracker.

22. The system of claim 1, wherein the positioning data for attitude determination is received from one of an orbiting, flying and ground-based transmitter.

23. A method for Autonomous Guidance and Attitude Control of a body using a closed-loop orbit controller and a closed-loop attitude controller, comprising:
- receiving position information of said body;
- receiving attitude information of said body
- determining velocity of said body;
- identifying a target position, a target velocity and a target attitude of a target;
- determining a first action to be taken by the body to change the position and velocity errors of the body to predetermined values using said closed-loop orbit controller in real time; and
- determining a second action to be taken by the body to change the attitude angle error and the angular velocity error of the body to predetermined values using said closed-loop attitude controller in real time.

* * * * *